United States Patent [19]

Penzotti

[11] Patent Number: 5,246,242
[45] Date of Patent: Sep. 21, 1993

[54] PASSIVELY STEERED TANDEM AXLE GROUP

[75] Inventor: Roger P. Penzotti, Mount Vernon, Wash.

[73] Assignee: Paccar Inc., Mount Vernon, Wash.

[21] Appl. No.: 593,119

[22] Filed: Oct. 5, 1990

[51] Int. Cl.$^5$ ............................................. B62D 53/06
[52] U.S. Cl. ..................................... 280/426; 280/448; 280/455.1; 280/81.6; 280/DIG. 14
[58] Field of Search ............... 280/426, 427, 428, 442, 280/448, 455.1, 432, 459, DIG. 14, 404, 81.1, 81.6

[56] References Cited

U.S. PATENT DOCUMENTS

| | | | |
|---|---|---|---|
| 1,655,481 | 1/1928 | van Leuven | 180/24.01 |
| 2,193,567 | 3/1940 | Pointer | 280/124 |
| 2,726,097 | 12/1955 | Darrough | 280/455.1 |
| 2,848,245 | 8/1958 | Georgi | 280/81 |
| 2,952,474 | 9/1960 | Gouirand | 280/113 |
| 3,156,487 | 11/1964 | Bigge | 280/426 |
| 3,168,332 | 2/1965 | Eynon | 280/426 |
| 3,542,390 | 11/1970 | Fikse | 280/81.6 |
| 3,774,941 | 11/1973 | Durr | 280/432 |
| 3,860,257 | 1/1975 | Mesly | 280/81 |
| 4,120,509 | 10/1978 | Reeve | 280/81 |
| 4,204,700 | 5/1980 | Haines | 280/432 |
| 4,390,189 | 1/1983 | Kunau | 280/81 |
| 4,573,699 | 3/1986 | Smith | 280/432 |
| 4,596,194 | 6/1986 | Paton | 105/199 |
| 4,684,142 | 8/1987 | Christenson | 280/81 |
| 4,720,118 | 1/1988 | Schultz | 280/426 |
| 4,735,432 | 4/1988 | Brown | 280/426 |
| 4,752,080 | 6/1988 | Rogers | 280/426 |
| 4,986,560 | 1/1991 | Tambay | 280/432 |
| 5,035,439 | 7/1991 | Petrillo | 280/426 |

FOREIGN PATENT DOCUMENTS

2059371  4/1981  United Kingdom ............ 280/455.1

Primary Examiner—Margaret A. Focarino
Assistant Examiner—Anne Marie Boehler
Attorney, Agent, or Firm—Seed and Berry

[57] ABSTRACT

A steering system for steering a vehicle, including a subframe disposed at the rear end of the vehicle for supporting the vehicle, the subframe being pivotably connected to the vehicle, a pair of axles attached in tandem to the subframe, the axles having wheels disposed thereon and a pivot restricting mechanism for partially restricting the pivotable movement of the tandem axle with respect to the vehicle. The pivot restricting mechanism exerts a torsional force on the subframe so as to bias the subframe in such a manner as to align the subframe in an aligned position where the wheels are aligned with the vehicle. The pivot point of the subframe is offset in the direction of one of the axles from the midpoint of the axles with respect to one another.

28 Claims, 7 Drawing Sheets

PASSIVELY STEERED TANDEM AXLE GROUP

DESCRIPTION

1. Technical Field

This invention relates to a steering system for multi-axle tractor-trailer combination vehicles.

2. Background of the Invention

Figure 1:
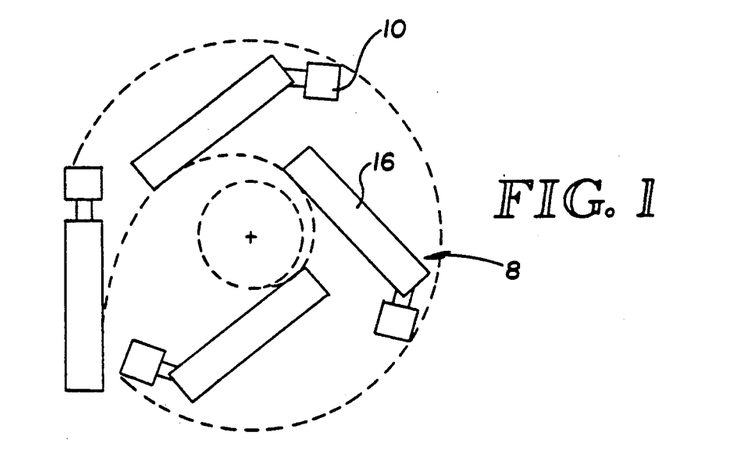
FIG. 1-4 are schematic, plan views illustrating offtracking experienced by conventional tractor-trailer combinations.
Figure 2:
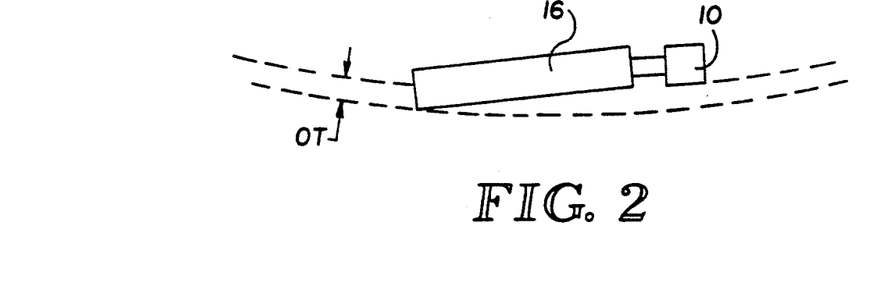
Figure 5:
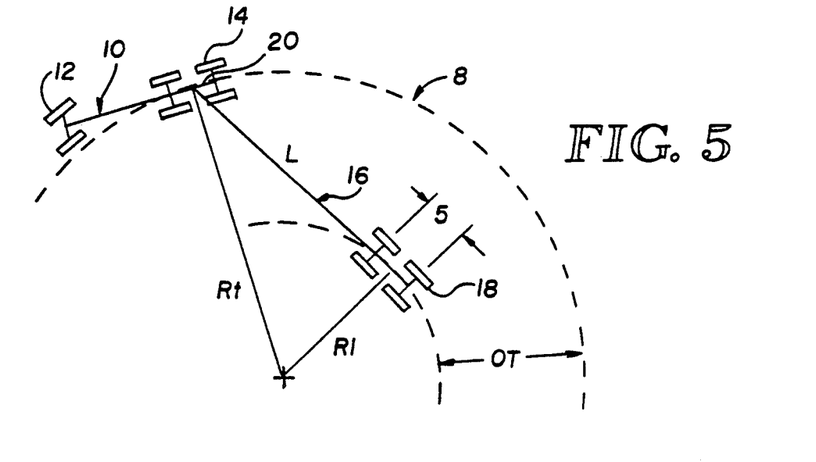
FIGS. 5, 6, 7, 8A-8C and 9 are schematic, plan views illustrating various off-tracking parameters effecting the off-tracking of a tractor-trailer combination.

Referring to FIGS. 1, 2, and 5 the tractor-semitrailer combination vehicle 8 is the prevalent truck configuration used for hauling goods on our nation's highways. This vehicle usually consists of (1) a tractor unit 10 with a single forward steering lead axle 12 and a pair of unsteered driving axles 14, and (2) a semitrailer 16 having a pair of unsteered axles 18 at the rear and a kingpin 20 at the front that is carried on the tractor's fifth wheel.

In recent years, the length of tractor-semitrailer combinations has increased. Trailers as long as 57 feet have become commonplace and maneuvering difficulties have been exacerbated.

When a vehicle negotiates a turn, the trailing axles generally do not follow the path of the lead axle. The divergence of the path of the trailing axles from that of the lead axle is referred to as offtracking. For vehicles with short wheelbases, such as passenger cars, offtracking is usually of little practical concern. Offtracking increases geometrically with wheelbase, however, and on longer vehicles presents serious maneuvering difficulties for the operator. It is also of concern to those who must design highways and facilities where large vehicles operate.

A vehicle can offtrack in two ways. Consider first the case of a tractor-semitrailer combination as it enters a constant radius turn at low speed. As the front of the vehicle negotiates the turn, the tractor and trailer rear axles gradually track toward the center of the turn and approach a steady-state turn radius as shown in FIG. 1. For large truck combinations, it is this type of offtracking that usually poses maneuvering difficulties for the drivers of the vehicles.

The second type of offtracking is less apparent and is the result of cornering forces generated during turns where speeds are higher and the turn radius larger. As shown in FIG. 2, as a tractor-trailer combination negotiates a large radius turn at high speed, centrifugal 0 forces cause the tires to operate at some angle of slip $\alpha$. The outward offtracking due to tire slip can exceed the inward offtracking tendency expected from the path curvature and result in the rear of the trailer tracking outside the path taken by the tractor. Outward offtracking can cause problems for drivers primarily because such behavior is unexpected. Drivers will normally steer the tractor along the outside edge of a roadway during a turn to allow for the expected offtracking of the trailer to the inside of the turn. In this situation, outward offtracking can result in the vehicle striking a curb, possibly precipitating a roll over, or leaving the edge of the roadway.

Figure 3:
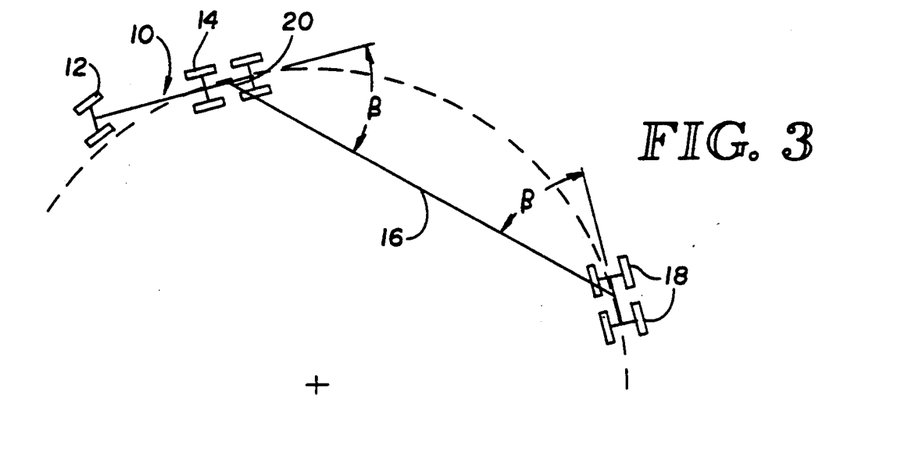

The problem of low-speed offtracking has been addressed in the past by providing some means for steering the rear wheels of the trailer on long combination vehicles. A common approach is to steer the wheels with a mechanical linkage to the tractor frame so that the trailer wheels are steered opposite to the direction of the turn by an amount determined by the articulation angle between the tractor and the trailer. If the steer angle is set equal to the articulation angle $\beta$, as shown in FIG. 3, the trailer wheels will track the same path as the rear wheels of the tractor under steady-state turning conditions. While such a system minimizes low-speed offtracking, there is a severe detrimental effect on the vehicle's longitudinal stability and handling performance at higher speeds. This arrangement also results in the rear of the trailer swinging outboard of the tractor path at the conclusion of a turn.

Figure 4:
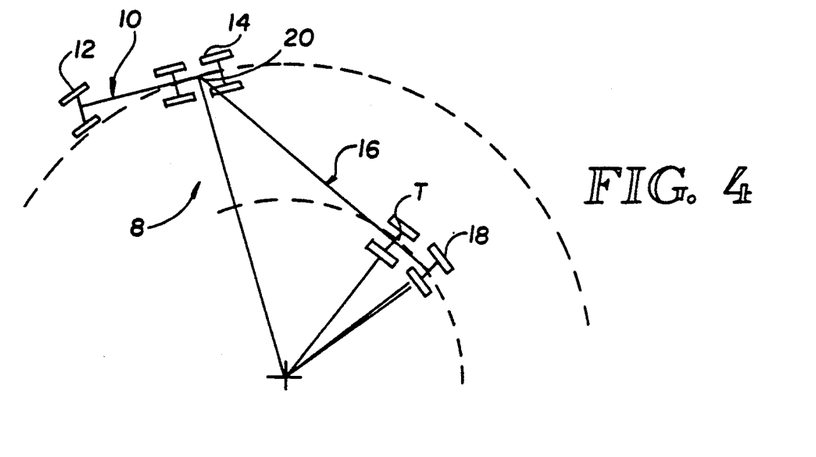

Another approach is to utilize some type of castering axle whereby the aft-most wheels align themselves with the turn path, as illustrated in FIG. 4. This effectively moves the point of tangency T to the towed path ahead of where it would be with both axles fixed and makes the trailer track as if it were shorter. While these devices slightly improve low-speed offtracking, they have detrimental effects on the dynamic stability of the vehicle. Since the castering wheels carry vertical loads, but are unable to generate side force, the lateral cornering load which the vehicle may support without loss of traction and directional stability is greatly reduced.

SUMMARY OF THE INVENTION

The present invention concerns a system for steering trailing axle groups which provides the low-speed maneuvering benefits of the systems described above, without the deleterious effects on high speed handling and stability. Additionally, the invention is a completely self-contained and passive part of the suspension structure, which in the case of a trailer application, requires no linkage or communication in any form with the towing vehicle -- a significant advantage.

The present invention resides in a steering system for steering a vehicle, comprising a subframe disposed at the rear end of the vehicle for supporting the vehicle, the subframe being pivotably connected to the vehicle, a pair of axles attached in tandem to the subframe, the axles having wheels disposed thereon and pivot restricting means for partially restricting the pivotable movement of the tandem axle with respect to the vehicle. The pivot restricting means exerts a torsional force on the subframe so as to bias the subframe in such a manner as to align the subframe in an aligned position where the wheels are aligned with the vehicle.

The pivot restricting means is a spring arrangement having a theoretical spring stiffness, $K_{TT}$, $$K_{TT} = \frac{2 C_\alpha S^2 F_Z}{L}$$

where
$C_\alpha$ = cornering stiffness coefficient of each tire or tires
$S$ = tandem axle spacing
$F_Z$ = vertical load on the tire
$L$ = trailer length (kingpin to tandem center).

The term "theoretical spring stiffness," as used herein, means the spring stiffness for zero steady-state offtracking.

According to the preferred embodiment of the invention, the actual torsional spring stiffness, $K_{TA}$, is $$K_{TA} = K_{TT} \times 1.5$$

According to a further embodiment of the invention, the pivot point of the subframe is offset in the direction of the rear axle from the midpoint of the axles with respect to one another. Specifically, the pivot point of the subframe is offset in the direction of the rear axle from the midpoint of the axles by a predetermined offset distance (e), where $$e = \frac{K_{TA}}{4 C_\alpha F_Z}$$

The functional concept described herein could be applied to any axle group having two or more non-steering, load-equalized axles. The primary benefit, and the application which is described in detail, are for semitrailers, since the long lengths of these units create the most severe offtracking problems. A two-axle tandem axle group will be used as the representative case, however, the principles would apply to groups containing more than two axles.

DETAILED DESCRIPTION OF THE INVENTION

Before describing a preferred embodiment, some explanation of the theory of operation is useful. The discussion will focus on the application of the invention as it pertains to a two-axle tandem axle unit on a semitrailer 16 in a typical tractor-semitrailer combination vehicle.

Consider first the case where the vehicle 8 executes a turn at low speed, where centrifugal forces are small. As described above, when a vehicle enters a turn, the trailing axles track to the inside of the turn. In the limiting, steady-state condition, the geometry is approximately as shown in FIG. 5. The offtracking $$OT = R_t - R_l \tag{1}$$

where $R_t$ is the radius of the path of the tractor tandem and $R_l$ is the radius of the path of the trailer tandem. For the steady-state turning condition, the turning radius of the trailer tandem $R_l$ is given by the expression $$R_l = \sqrt{R_t^2 - L^2} \tag{2}$$

where L is the distance from the trailer kingpin to the center of the trailer tandem. Note that the point where the trailer is tangent to the path defined by radius $R_l$ is actually slightly aft of the mid-point between the two trailer axles. The error is small for normal geometries, however, and the assumption that the tangency point falls at the mid-point between the axles is made to simplify the analysis.

Figure 6:
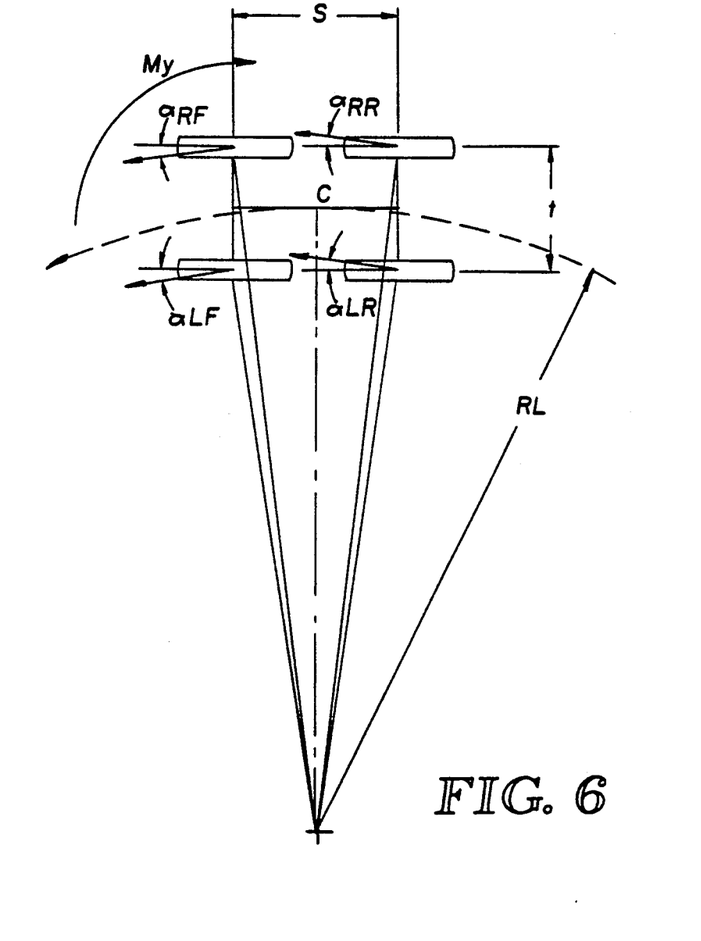

Since the trailer's axles are parallel to one another, the axes of the axles cannot both pass through the center of the turn. Therefore, some scrubbing of the tires occurs as the tandem moves along its trajectory. Each tire operates at some slip angle $\alpha$, as shown in FIG. 6, which results in a lateral force on each tire, and a moment $M_y$ on the tandem which resists the turning motion.

For small angles of slip, the moment created by the tire slip forces is approximately equal to $$M_y = \frac{C_\alpha S^2 F_Z}{R_l} \tag{3}$$

where
$C_\alpha$ = tire cornering stiffness coefficient
S = tandem axle spacing
$F_Z$ = vertical load on each tire.

Figure 7:
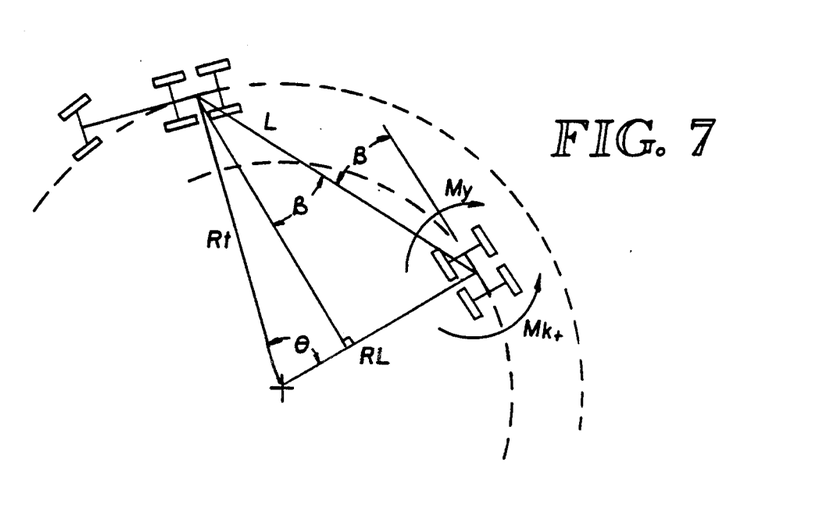

Now consider the case where the trailer tandem, as a unit, is pivotally connected to the trailer body so that it may rotate in the yaw plane relative to the trailer body. For the moment, let the pivot point be located at the tandem centroid C—that is, longitudinally midway between the two axles, on the trailer centerline. Additionally, let the rotational motion of the tandem about the pivot be restrained by a linear torsional stiffness $K_T$ which resists the yawing motion. As the trailer enters a turn, the tandem will yaw toward the outside of the turn until the moment due to tire slip $M_y$ is in equilibrium with the resisting moment MKT from torsional stiffness $K_T$(FIG. 7). Thus, we can write $$M_y = K_T \beta = \frac{C_\alpha S^2 F_Z}{R_l} \tag{4}$$

where $\beta$ = tandem yaw angle.

In order to solve for the steady-state path radius $R_l$ we need to define the unknown tandem yaw angle $\beta$ in terms of known parameters. From the geometry of FIG. 7 we can define the following relations $$L^2 = R_t^2 + R_l^2 - 2 R_t R_l \cos\theta \tag{5}$$

$$R_l R_t \sin(90-\theta) + L \sin\beta \tag{6}$$

$$L \cos\beta = R_t \sin\theta \tag{7}$$

Solving these three independent equations we find that for small angles of $\beta$, $$\beta \approx \frac{R_l - \frac{R_t^2 + R_l^2 - L^2}{2R_l}}{L} \tag{8}$$

After substituting this expression into equation (4) and rearranging, we obtain the following expression for the path radius $P_l$.

$$R_t = \sqrt{R_t^2 - L^2} + \frac{2 C_\alpha S^2 F_z L}{K_T} \tag{9}$$

Equation (9) expresses the trailer tandem turn radius in terms of the tractor turn radius $R_t$, the trailer length L (kingpin to tandem), the tire loading $F_Z$ and cornering stiffness $C\alpha$, the tandem axle spacings, and the torsional stiffness $K_T$ of the mounting. Note that if $K_t = \infty$, this expression reduces to equation (2), the solution for the fixed tandem.

Also note that if the steady-state track of the trailer tandem is to be the same as the tractor tandem, $R_l = R_t$. Substituting $R_l$ for $R_t$ in equation (9) and solving for $K_T$ gives $$K_T = \frac{2 C_\alpha s^2 F_Z}{L} \quad ; R_l = R_t \tag{10}$$

The steady-state behavior of a system with this yaw stiffness will be perfect followability of the trailer, the tandem tracking the same path as the kingpin. As the tire slip angles increase to the point where the tire can produce no further increase in side force, the tandem yaw angle will be less than that required for perfect followability and the tandem will then track inward to some degree.

$K_T$ represents the "theoretical spring stiffness" meaning the spring stiffness for zero steady-state offtracking. However, vehicles do not operate in steady-state turns for very long. Therefore, the transient turning behavior must also be considered. If the system just described is put into a transient (but still low speed) turning situation, an undesirable trait becomes evident. As the tractor exits the turn, the rear of the trailer will take a track outboard of the path of the kingpin, an undesirable situation. This behavior is eliminated by making the torsional stiffness $K_T$ approximately 50% higher than the theoretical zero-offtrack stiffness defined by equation (20). This results in some offtracking to the inside of the turn, but prevents any overshoot as the combination exits the turn.

Now consider the case where the vehicle is moving in a steady-state turn at higher speed, where the centrifugal forces are not insignificant. In addition to the slip forces produced by the path curvature, there will be lateral forces due to inertial loads.

Figure 8A:
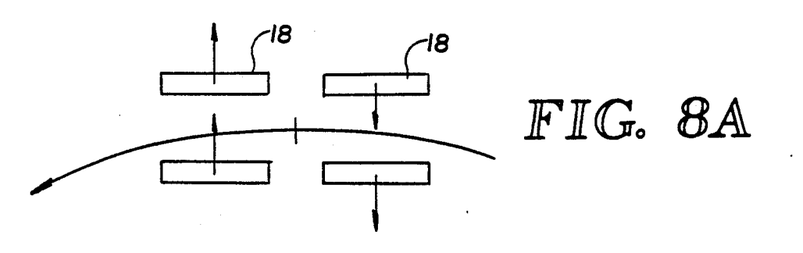
Figure 8B:
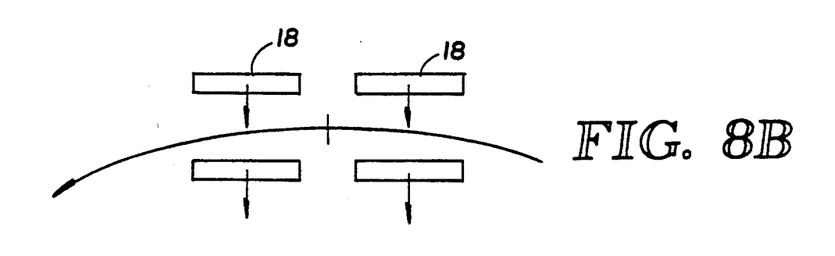
Figure 8C:
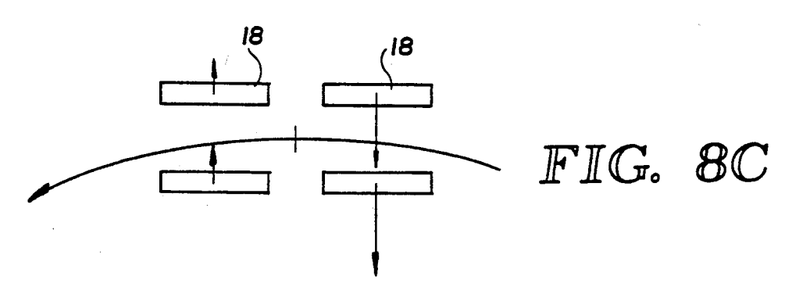

Let us first examine how the cornering loads affect the tire slip angles for the fixed tandem. Note from FIG. 8 that on the forward axle tires the cornering forces (FIG. 8B) act opposite to the forces due to path curvature (FIG. 8A). On the rear axle tires the cornering forces (FIG. 8B) act in the same direction as the forces due to path curvature (FIG. 8A). Thus, under the combined loading, the lateral forces, and consequently, the slip angles at the forward tires, will be less than those at the rear tires (FIG. 8C). The result is that the point at which the trailer is tangent to the path moves forward (L in equation (2) is reduced) as the lateral loads increase and the path radius $R_l$ increases. Note, for example, that if the lateral acceleration forces were equal to the tire forces from path curvature, the net side force on the forward tires would be zero. Thus, they would operate at zero slip angle and the axis of the forward axle would pass through the turn center.

Now return to the case of the pivotally mounted tandem. It is readily seen that if the pivot point is located at the tandem centroid, then lateral loads from the cornering forces result in no net moment about the pivot. Therefore, cornering loads will not influence the tandem yaw angle $\beta$. However, due to the yaw compliance, the slip angles at the tires will be less than they would be if the tandem had no yaw compliance. This is an undesirable condition since it will increase outward offtracking and reduce directional stability—the same faults identified for the prior art described earlier.

Now consider a modification to the system just described that eliminates this undesirable characteristic and actually increases tire slip angle as lateral loading increases and results in improved handling and directional stability of the vehicle.

Figure 9:
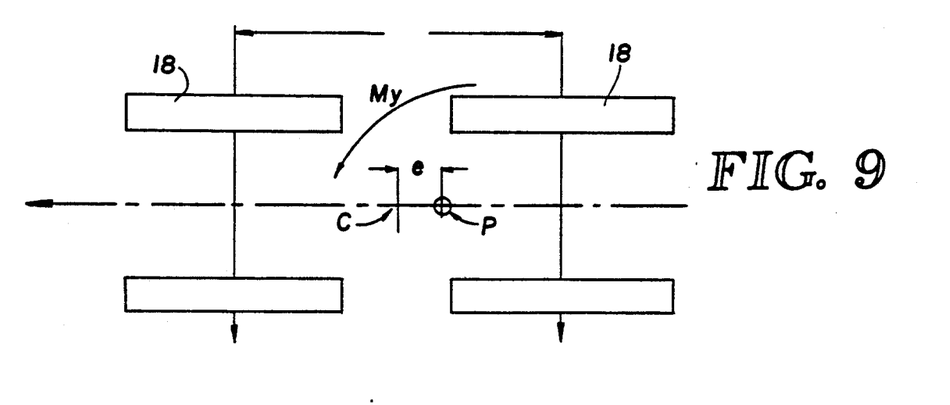

Let the tandem pivot point P be located not at the tandem centroid, but instead be slightly aft of the centroid by some distance (e) as shown in FIG. 9. Under low speed turning conditions, the behavior is virtually the same as for the centroidal pivot.

Now, however, the lateral tire forces due to cornering result in a net moment on the tandem which opposes the moment generated by the path curvature. At higher speeds, the path radius is large and the tire forces due to path curvature are relatively small. The moment generated by the cornering loads can easily exceed the moment due to path curvature and result in a negative (inward) yaw angle of the tandem. Thus, the outward offtracking tendency is reduced or eliminated.

The outward offtracking effect can be negated by selecting the pivot offset distance e such that the tandem yaw angle $\beta$ that results from the cornering equals the tire slip angle generated by the cornering forces.

Under a lateral acceleration of $a_y$, the lateral force on each tire is $$F_y = a_y F_Z \tag{11}$$

The moment about the tandem pivot due to lateral acceleration is $$M_y = 4 F_y e = 4 a_y F_Z e \tag{12}$$

The corresponding component of tandem yaw angle $$\beta = \frac{M_y}{K_T} = \frac{4 a_y F_Z e}{K_T} \tag{13}$$

and the component of tire slip is $$\alpha = \frac{a_y}{C_\alpha} \tag{14}$$

Equating (13) and (14) and solving for the pivot offset e, we obtain $$e = \frac{K_T}{4 C_\alpha F_Z} \tag{15}$$

Note that the offset distance e to eliminate offtracking due to cornering forces is independent of both turn radius and lateral acceleration.

Thus, it is evident that by properly selecting the tandem torsional stiffness $K_T$ and pivot offset distance e it is possible to eliminate steady-state offtracking over the entire linear regime of operation.

Having laid the theoretical basis for the present invention, a preferred embodiment will now be described.

Figure 10:
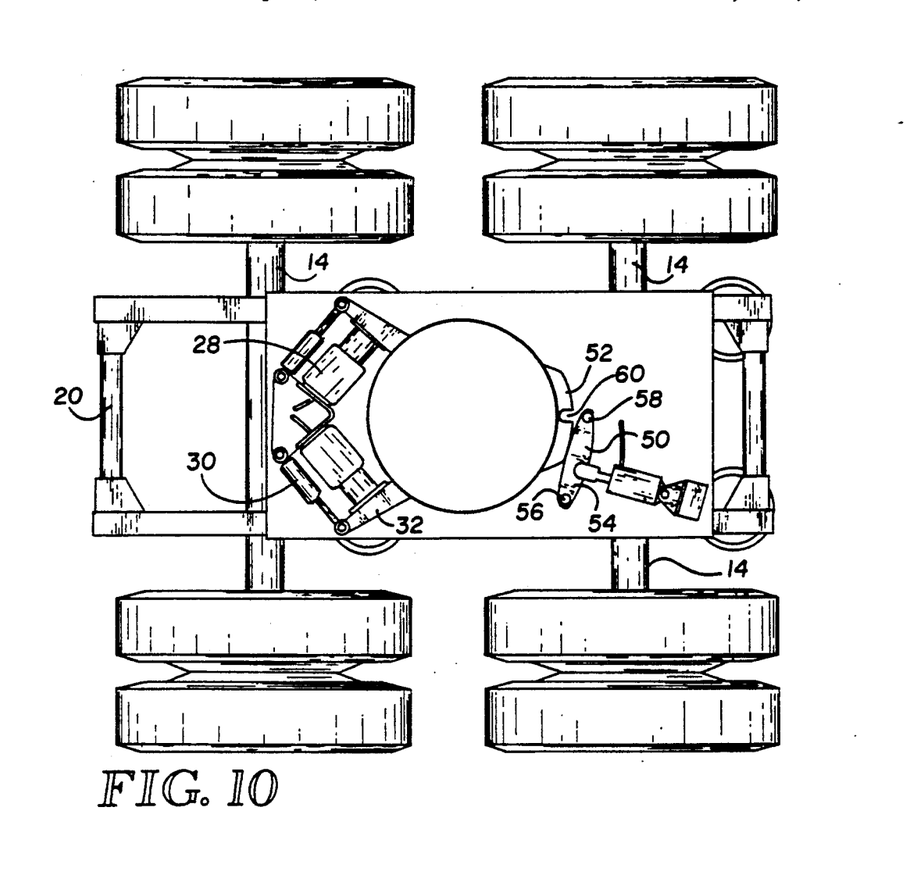
FIG. 10 is a plan view of a semi-trailer having a passive steering system according to a first embodiment of the invention.
Figure 11:
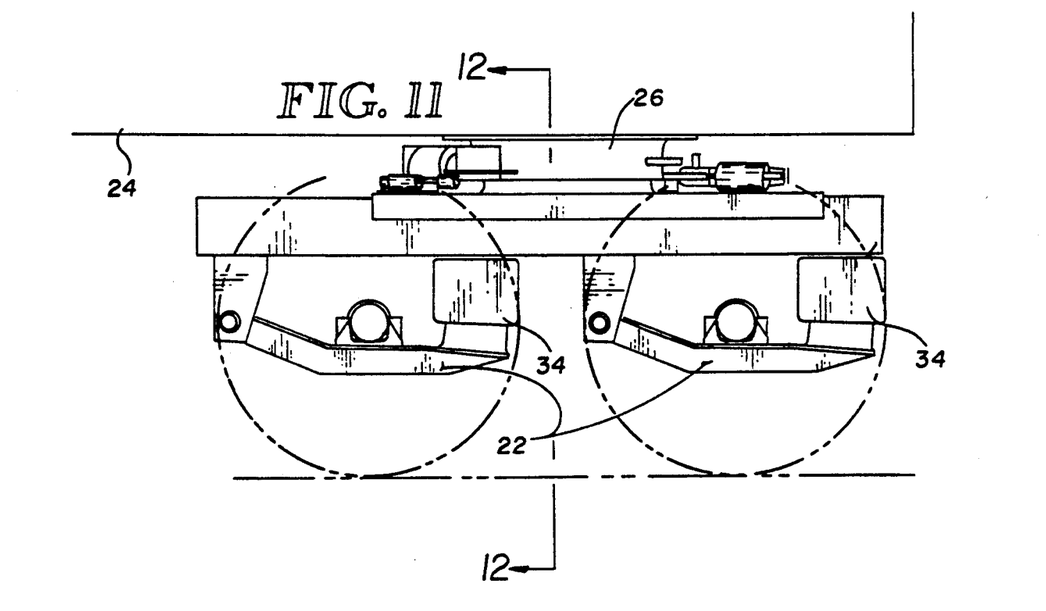
FIG. 11 is a side view of the FIG. 10 embodiment.

FIGS. 10 and show the aft portion of a semitrailer 16 in plan and side elevation views, respectively. The body of the trailer is omitted in the plan view for clarity. As described above, a pair of axles 14 in tandem are attached to a subframe 20 by means of a typical suspension system 22. An air suspension is shown, and this type of suspension affords certain operational benefits, which will be described later. However, the invention is not restrictive as to the type of suspension employed. A walking beam suspension, four-spring suspension, or other type of suspension which equalizes loads between the axles could be utilized without affecting the function of the invention.

Figure 12:
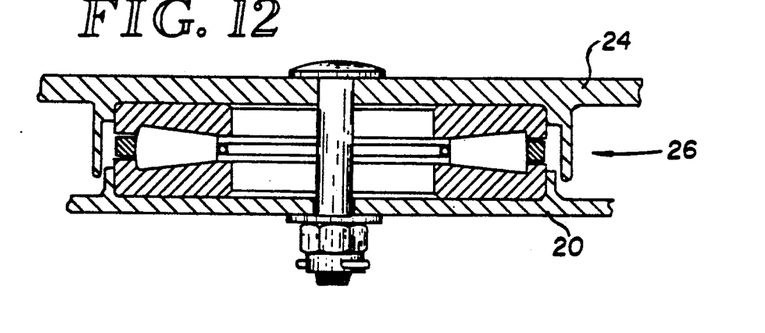
FIG. 12 is a sectional view of the bearing assembly connecting the subframe of the trailer frame taken along line 12—12 of FIG. 11.

In the preferred embodiment, subframe 20 supports, and is pivotally connected to the trailer body structure 24 through a bearing assembly 26, a detail of which is shown in FIG. 12. The bearing assembly shown is a conventional tapered roller thrust bearing assembly, although any rolling element thrust bearing assembly would suffice. However, as illustrated in FIG. 9, the axis of the bearing assembly is located aft of the tandem centroid by a small amount (e), typically 5% to 15% of the span between the axles depending on the specific performance objectives.

Rotational freedom between the trailer body 24 and the subframe 20 is controlled by airsprings 28 and dampers 30, as illustrated in FIG. 10. Airsprings 28 are arranged with one end acting on supports 32 which are rigidly attached to the trailer body 24, and the other end acting on the subframe assembly 20 such that rotation of the subframe with respect to the trailer body compresses one airspring while extending the other, thereby providing a moment about the pivot tending to align the subframe with the trailer body. Dampers 30 are likewise configured to act between the subframe 20 and the trailer body 24. The dampers are sized to supercritically damp the resonant yaw mode of the subframe assembly, while still allowing low rates of rotation between the subframe and the trailer body.

In the preferred embodiment, the aligning airsprings 28 are plumbed to the suspension airsprings 34 and therefore operate at the same air pressure. Since the pressure in the suspension airsprings is nearly proportional to the load supported by the suspension, the aligning stiffness will also be approximately proportional to the load being carried. From equation (10) the aligning stiffness required to achieve a given offtrack performance is proportional to the load on the tires. Thus, the preferred embodiment yields nearly constant offtracking performance regardless of the load being carried.

Figure 13:
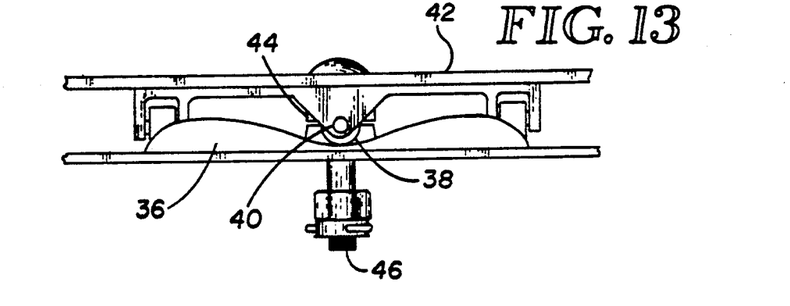
FIG. 13 is side view of an alternative arrangement for providing load-compensating alignment according to another embodiment of the invention.

An alternative embodiment which would provide a load-compensating aligning moment without dependence on an air suspension is shown schematically in FIG. 13. In this embodiment, the bearing assembly of the preferred embodiment is replaced with a race and roller arrangement which functions as follows. Attached to the subframe 20 is a race 36 which is circular in plan view, but which is profiled in elevation about its circumference. Rollers 38 are carried on pins 40 which are in turn attached to an upper member 42 which is securely attached to the vehicle body. Four rollers located 90° apart are shown, however the actual numbers of rollers used could differ. A central bearing 44 maintains the axis of the race 36 coincident with the axis of the upper member 42, but allows relative rotation in the yaw plane and relative motion along the common vertical axis. A king bolt 46 secures the race 36 to the upper member 42 and is of sufficient length to permit the aforementioned relative translation between the race 36 and the upper member 42. As relative rotation occurs between the subframe and the vehicle body, the rollers 38 follow the profile of the race 36 and cause the body to be lifted away from the subframe. The profile of the race will determine how much the body is lifted for a given angle of rotation between the body and the subframe. The tangential component of the normal loads on the rollers creates a torque about the axis of the race 36 and upper member 42 tending to return the subframe into alignment with the vehicle body. The profile of the race can be tailored to provide any various restoring moment characteristics. The magnitude of the restoring moment is proportional to the load on the rollers which, of course, is proportional to the load being carried.

Alternative embodiments which utilize a normal bearing assembly, but which do not employ an air suspension, could still utilize airsprings for the aligning springs, using a predetermined pressure or perhaps operator adjustment of the pressure to match the loading condition. Coil springs or other fixed rate centering devices could also be employed, in which case the stiffness should be selected for proper operation in the fully laden condition. Operation at lighter loads would result in some low-speed offtracking.

Referring again to FIG. 10, a locking mechanism 50 is provided to prevent rotation of the subframe assembly under certain conditions. A locking plate 52 is attached to the trailer body 24. A locking arm assembly 54 is pivotally attached to the subframe assembly 20 at pivot 56. Rotation of locking arm assembly 54 about pivot 56 will cause engagement of pin 58 with slot 60 on the locking plate 52.

Figure 14:
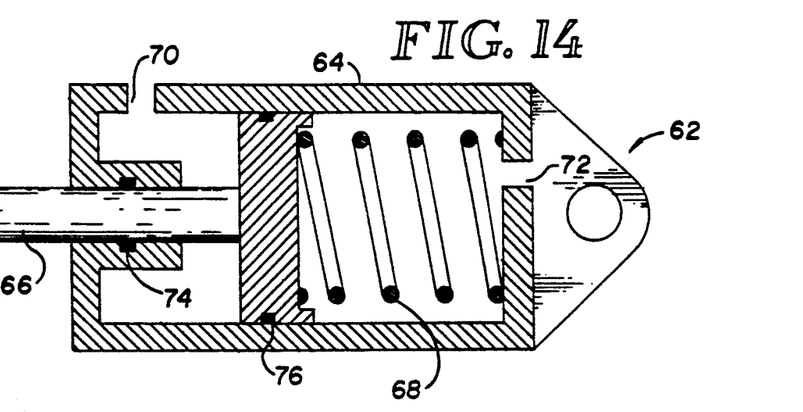
FIG. 14 is a sectional view of the locking assembly for preventing rotation of the subframe.

Actuation of the locking arm assembly is provided by actuator 62, shown in detail in FIG. 14. The actuator consists of a cylinder 64, which contains a piston and rod assembly 66, and a spring 68. An air port 70 is provided for pressurization of the rod side of the cylinder. A second port 72 vents the other end of the cylinder to atmosphere. Seals 74 and 76 are provided to prevent air leakage from the pressurized side of the cylinder. When no pressure is applied to the air port 70 the spring 68 causes the piston to fully extend the rod from the cylinder. Air pressure applied to the air port 70 causes the piston to compress the spring 68 and the piston rod 66 to retract into the cylinder.

Figure 15:
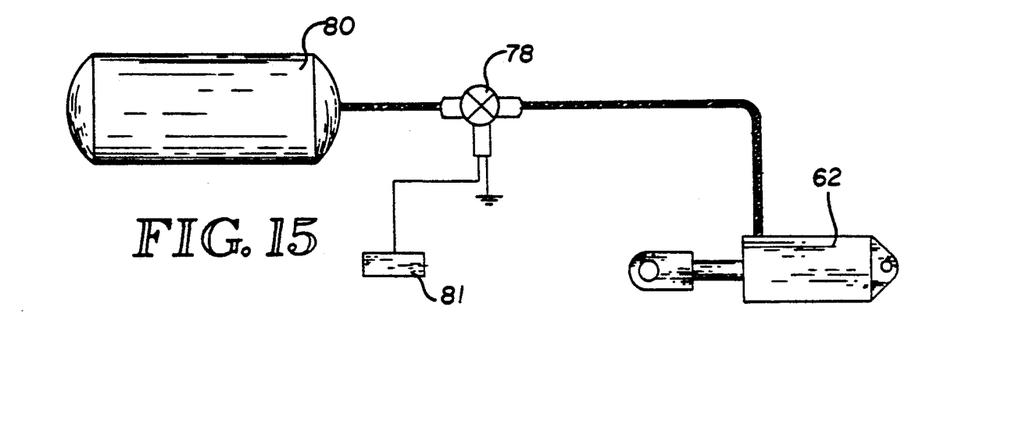
FIG. 15 is an electrical and air piping schematic illustration of the mechanism for initiating the locking of the locking assembly.

The locking mechanism provides for locking of the subframe assembly in the straight-ahead position while the vehicle is being operated in reverse. The reason this is desirable is as follows. Consider the situation where the vehicle has proceeded in a forward direction along a curved path as shown in FIG. 7. The tandem will have yawed to some angle $\beta$ as shown. Note that if the direction of the vehicle is reversed, the tandem will immediately tend to align itself with the trailer body. The yaw compliance will work against the driver's efforts to guide the trailer along the desired path. To facilitate backing operations, it is therefore desirable to defeat the yaw compliance mechanism. The means for doing this is shown in FIG. 15.

The actuator 62 is plumbed to a solenoid valve 78, which is in turn connected to the vehicle's pressurized air supply 80. During normal operation, the solenoid 78, which is of the normally open type, permits pressurization of the actuator by the vehicle's air supply. The solenoid is energized when the vehicle's transmission is shifted into reverse, utilizing the same circuitry used for the back-up lights 81. Energizing the solenoid causes the valve to close and exhaust air from the actuator. As the vehicle begins to back up, the tandem swings into alignment with the trailer body allowing locking pin 58 to engage slot 60 thereby restraining the tandem from further rotation. When the transmission is shifted out of reverse gear, the solenoid valve opens and pressurizes the actuator, allowing the locking mechanism to disengage and operate in the normal fashion.

Various schemes for the pivotal attachment of the subframe assembly to the vehicle body can be conceived. While it is desirable to have the aligning moment vary in proportion to the load being carried to ensure consistent offtracking and handling behavior, some applications where the variation in load is small could use simpler schemes. As noted in the original disclosure, coil springs or other fixed rate springs could be substituted for the air springs in the preferred embodiment.

Figure 16:
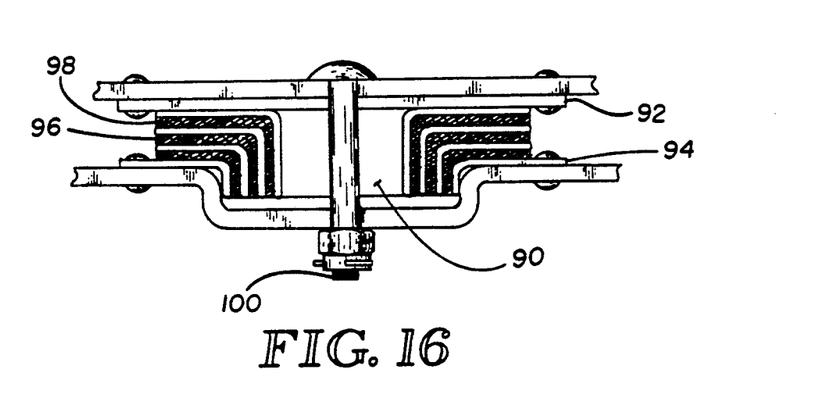
FIG. 16 is a sectional view of an alternative bearing arrangement.

An example of an embodiment having a fixed torsional spring constant is shown in FIG. 16. The subframe 20 is connected to the body structure 24 with an elastomeric bearing 90. Various constructions of the bearing could be conceived, so long as the structural and operational objectives are met. The arrangement shown in FIG. 16 would accommodate the relatively large amount of shear deformation in the elastomer required by the relative rotation between the subframe and body, yet would also provide the necessary high stiffness in the vertical and roll directions. The bearing assembly is axisymmetric and consists of an upper mounting plate 92, which is attached to the vehicle body, a lower mounting plate 94, which is attached to the subframe assembly, and a multiplicity of spacer plates 96, all of which are bonded to an elastomer 98. The construction shown provides a relatively soft stiffness in yaw while maintaining high stiffness in the other 5 degrees of freedom. A king bolt 100 is provided for fail-safe attachment between the upper and lower attachment plates.

I claim:

1. A steering system for steering a vehicle wherein the vehicle has a front end and a rear end, opposite the front end, and wherein the front end of the vehicle is constructed to be coupled to a tractor, comprising:
   a subframe disposed at the rear end of said vehicle for supporting said vehicle, said subframe including pivot means for pivotally coupling said subframe to said vehicle, said pivot means being coupled to said subframe to define a pivot point of said subframe about which said vehicle pivots;
   a pair of axles attached in tandem to said subframe, said axles having wheels disposed thereon, said pivot point being offset in the rearward direction from the midpoint of said axles with respect to one another; and
   pivot resisting means for partially resisting the pivotable movement of said axles about said vertical axis with respect to said vehicle, said pivot resisting means further including means for varying the amount that the pviotable movement is resisted in response to variations in the load supported by said subframe.

2. The steering system of claim 1 wherein said pivot restricting means exerts a torsional force on said subframe so as to bias said subframe in such a manner as to align said subframe in an aligned position where said wheels are aligned with said vehicle.

3. The steering system of claim 2 wherein said pivot restricting means comprises:
   a race fixedly attached to said subframe, said race having a cammed surface disposed thereon;
   a roller member secured to said vehicle and contacting said cammed surface of said race, wherein when said subframe is pivoted with respect to said vehicle from said aligned position said roller member is urged to roll up said cammed surface and wherein the weight of said vehicle on said roller member tends to restrain said pivoting and exert a torque tending to return said subframe to said aligned position.

4. The steering system of claim 3 wherein said race is circular in shape and wherein said cammed surface extends around the entire circumference of said race.

5. The steering system of claim 4 wherein the profile of said cammed surface determines the magnitude of said torque.

6. The steering system of claim 2 wherein said pivot restricting means comprises a spring means connected between said subframe and said vehicle.

7. The steering system of claim 6 wherein said spring means comprises a pair of aligning air springs, one end of each of said aligning air springs being attached to said subframe and the other end of each of said air springs being attached to said vehicle in such a manner that rotation of said subframe from the aligned position compresses one of said aligning air springs while extending the other of said aligning air springs.

8. The steering system of claim 7 wherein said aligning air springs have a theoretical spring stiffness, $K_{TT}$, equal to;

$$K_{TT} = \frac{2 C_\alpha S^2 F_Z}{L}$$

where
$C_\alpha$ = tire cornering stiffness coefficient
$S$ = tandem axle spacing
$F_Z$ = vertical load on each tire.

9. The steering system of claim 8 wherein said aligning springs have a torsional spring stiffness, $K_{TA}$, equal to;

$$K_{TA} = K_{TT} \times 1.5.$$

10. The steering system of claim 7 wherein said vehicle includes suspension air springs have pressurized air therein and wherein each of said aligning air springs communicates with the pressurized air in the suspension air springs of said vehicle such that the air pressure in said aligning air springs is the same as the air pressure of the suspension air springs.

11. The steering system of claim 9 wherein said subframe further includes pivot means for pivotally coupling said subframe to said vehicle, said pivot means being coupled to said subframe to define a pivot point of said subframe about which said vehicle pivots, the pivot point being offset in the rearward direction from the midpoint of said axles by a predetermined offset distance (e), where $$e = \frac{K_{TA}}{4 C_\alpha F_Z}.$$

12. The steering system of claim 1, further comprising locking means for locking said subframe such that said subframe is maintained in a position aligned with said vehicle when said vehicle is being driven in reverse.

13. The steering system of claim 12 wherein said locking means comprises:
   a locking plate attached to said vehicle;
   a locking arm, one end of said locking arm being pivotably attached to said subframe and the other end having an engaging means for engaging said locking plate; and
   pivoting means for pivoting said locking arm so as to cause said engaging means to engage said locking plate.

14. The steering system of claim 13 wherein said vehicle includes backup lights and wherein said pivoting means is actuated by activation of the back-up lights of said vehicle such that when aid vehicle is driven in reverse, said subframe will not pivot with respect to said vehicle.

15. A trailer having an improved steering arrangement for a tractor/trailer unit in which the trailer is pulled by the tractor, comprising:
   a trailer body having a front end and a rear end, said front end including means for coupling said trailer body to the tractor for pivoting movement;
   a subframe coupled to said rear end of said trailer body for supporting said trailer body, said subframe including pivot means for pivotally coupling said subframe to said vehicle, said pivot means being coupled to said subframe to define a pivot point of said subframe about which said vehicle pivots;
   a pair of axles attached to said subframe in tandem with one another, said axles having wheels disposed thereon, said pivot point being offset in the rearward direction form the midpoint of said axles with respect to one another; and
   pivot resisting means for partially resisting the pivotable movement of said subframe with respect to said trailer body, said pivot resisting means further including means for varying the amount that the pivotable movement is resisted in response to variations in the load supported by said subframe.

16. The trailer of claim 15 wherein said pivot restricting means exerts a torsional force on said subframe so as to bias said subframe in such a manner as to be aligned with said trailer body.

17. The trailer of claim 16 wherein said pivot restricting means comprises:
   a race fixedly attached to said subframe, said race having a cammed surface disposed thereon;
   a roller member secured to said vehicle and contacting said cammed surface of said race, wherein when said subframe is pivoted with respect to said vehicle from said aligned position said roller member is urged to roll up said cammed surface and wherein the weight of said vehicle on said roller member tends to restrain said pivoting and exert a torque tending to return said subframe to said aligned position.

18. The trailer of claim 17 wherein said race is circular in shape and wherein said cammed surface extends around the entire circumference of said race.

19. The trailer 18 wherein the profile of said cammed surface determines the magnitude of said torque.

20. The trailer of claim 16 wherein said pivot restricting means comprises a spring means connected between said subframe and said trailer body.

21. The trailer of claim 20 wherein said spring means comprises a pair of aligning air springs, one end of each of said aligning air springs being attached to said subframe and the other end of each of said aligning air springs being attached to said trailer body in such a manner that rotation of said subframe from the aligned position compresses one of said aligning air springs while extending the other of said aligning air springs.

22. The trailer of claim 21 wherein said aligning air springs have a theoretical torsional spring stiffness, $K_{TT}$, equal to;

$$K_{TT} = \frac{2 C_\alpha S^2 F_Z}{L}$$

where
$C_\alpha$ = tire cornering stiffness coefficient
$S$ = tandem axle spacing
$F_Z$ = vertical load on each tire.

23. The trailer of claim 22 wherein said aligning springs have a torsional spring stiffness, $K_{TA}$, equal to;

$$K_{TA} = K_{TT} \times 1.5.$$

24. The trailer of claim 21 wherein said trailer body further comprises suspension air springs, having pressurized air therein, for supporting the weight of said trailer body, and wherein the pressurized air in said aligning air springs communicates with the pressurized air in said suspension air springs such that the air pressure of said aligning air springs is substantially the same as the air pressure in said suspension air springs.

25. The trailer of claim 23 wherein said subframe further includes pivot means for pivotally coupling said subframe to said trailer body, said pivot means being coupled to said subframe to define a pivot point of said subframe about which said trailer pivots, the pivot point being offset in the direction of one of said axles from the midpoint of said axles by a predetermined distance (e), where $$e = \frac{K_{TA}}{4 C_\alpha F_Z}.$$

26. The trailer of claim 15, further comprising locking means for locking said subframe such that said subframe is maintained in a position aligned with said trailer body.

27. The trailer of claim 26 wherein said locking means comprises:
   a locking plate attached to said vehicle;
   a locking arm, one end of said locking arm being pivotably attached to said subframe and the other end having an engaging means for engaging said locking plate; and
   pivoting means for pivoting said locking arm so as to cause said engaging means to engage said locking plate.

28. The trailer of claim 27 wherein said trailer body further comprises vehicle backup lights, said pivoting means being actuated by activation of said vehicle backup lights such that when the trailer is driven in reverse, said subframe will not pivot with respect to said trailer body.

* * * * *

UNITED STATES PATENT AND TRADEMARK OFFICE
CERTIFICATE OF CORRECTION

PATENT NO. : 5,246,242
DATED : September 21, 1993
INVENTOR(S) : Roger P. Penzotti It is certified that error appears in the above-identified patent and that said Letters Patent is hereby corrected as shown below:

In column 10, claim 10, line 46, please delete "have" and substitute therefor --having--.

In column 11, claim 14, line 15, please delete "aid" and substitute therefor --said--.

In column 11, claim 15, line 36, please delete "form" and substitute therefor --from--.

In column 11, claim 19, line 66, after "trailer" and before "18," please insert --of claim--.

Signed and Sealed this

Seventeenth Day of May, 1994

Attest:

BRUCE LEHMAN

Attesting Officer       Commissioner of Patents and Trademarks